US010673797B2

(12) United States Patent
Osipkov et al.

(10) Patent No.: US 10,673,797 B2
(45) Date of Patent: Jun. 2, 2020

(54) MESSAGE CATEGORIZATION

(71) Applicant: Microsoft Technology Licensing, LLC, Redmond, WA (US)

(72) Inventors: Ivan Osipkov, Bellevue, WA (US); Wei Jiang, Redmond, WA (US); Malcolm Hollis Davis, Kirkland, WA (US); Douglas Hines, Kenmore, WA (US); Joshua Korb, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/299,070

(22) Filed: Mar. 11, 2019

(65) Prior Publication Data

US 2019/0342250 A1 Nov. 7, 2019

Related U.S. Application Data

(63) Continuation of application No. 15/922,906, filed on Mar. 15, 2018, now Pat. No. 10,263,935, which is a continuation of application No. 14/803,752, filed on Jul. 20, 2015, now Pat. No. 9,954,810, which is a continuation of application No. 13/180,838, filed on Jul. 12, 2011, now Pat. No. 9,087,324.

(51) Int. Cl.
*G06F 15/16* (2006.01)
*H04L 12/58* (2006.01)
*H04L 29/08* (2006.01)
*G06Q 10/10* (2012.01)

(52) U.S. Cl.
CPC ........... *H04L 51/22* (2013.01); *G06Q 10/107* (2013.01); *H04L 67/306* (2013.01)

(58) Field of Classification Search
USPC ........................................................ 709/206
See application file for complete search history.

(56) References Cited

U.S. PATENT DOCUMENTS 6,167,435 A * 12/2000 Druckenmiller .... G06F 16/9535
709/206
6,704,772 B1 * 3/2004 Ahmed ................ G06Q 10/107
709/206

(Continued)

OTHER PUBLICATIONS

"Final Office Action Issued in U.S. Appl. No. 13/180,877", dated Apr. 5, 2019, 25 Pages.

*Primary Examiner* — Alicia Baturay

(57) ABSTRACT

One or more techniques and/or systems are provided for defining a message behavior profile for a sender, which may be used to categorize messages from the sender. A message behavior profile may be defined based upon, for example, message distribution behavior of the sender (e.g., volume, frequency, variance in content amongst messages sent to recipients, etc.); recipient interactions with messages from the sender (e.g., message read rates, message response rates, etc.); unsubscription options comprised within messages from the sender; and/or other factors. In this way, the message behavior profile and/or features extracted from a message may be used to categorize a message from the sender (e.g., newsletter, commercial advertisements, alert, social network etc.). Categorized messages may be organized into folders, displayed or hidden within views, and/or processed based upon their respective categorizations.

20 Claims, 8 Drawing Sheets

(56) References Cited

U.S. PATENT DOCUMENTS

| | | | |
|---|---|---|---|
| 6,832,244 B1* | 12/2004 | Raghunandan | H04L 51/14 709/206 |
| 7,096,498 B2* | 8/2006 | Judge | H04L 63/0236 726/22 |
| 7,206,814 B2* | 4/2007 | Kirsch | H04L 51/12 709/206 |
| 7,213,260 B2* | 5/2007 | Judge | H04L 63/145 726/3 |
| 7,219,131 B2* | 5/2007 | Banister | G06Q 10/107 709/202 |
| 7,225,466 B2* | 5/2007 | Judge | G06F 21/554 726/22 |
| 7,413,085 B2* | 8/2008 | Zager | G06Q 10/107 209/206 |
| 7,422,115 B2* | 9/2008 | Zager | G06Q 10/107 209/206 |
| 7,428,576 B2* | 9/2008 | Shuster | H04L 51/28 709/206 |
| 7,519,671 B2* | 4/2009 | Ho | G06Q 10/107 709/206 |
| 7,548,956 B1* | 6/2009 | Aoki | G06Q 10/107 709/204 |
| 7,584,426 B2* | 9/2009 | Chang | G06Q 10/107 715/257 |
| 7,603,417 B2* | 10/2009 | Ben-Yoseph | H04L 51/043 709/206 |
| 7,613,776 B1* | 11/2009 | Ben-Yoseph | H04L 51/043 709/206 |
| 7,640,322 B2* | 12/2009 | Wendkos | H04L 51/12 709/206 |
| 7,694,128 B2* | 4/2010 | Judge | H04L 51/12 380/282 |
| 7,707,218 B2* | 4/2010 | Gocht | G06Q 30/02 707/758 |
| 7,716,297 B1* | 5/2010 | Wittel | H04L 51/12 709/206 |
| 7,725,544 B2* | 5/2010 | Alspector | H04L 51/12 709/206 |
| 7,831,707 B2* | 11/2010 | Bardsley | H04L 51/00 709/206 |
| 7,844,678 B2* | 11/2010 | Malik | H04L 51/12 709/206 |
| 7,921,174 B1* | 4/2011 | Denise | G06Q 10/107 709/206 |
| 7,930,353 B2* | 4/2011 | Chickering | H04L 51/12 709/206 |
| 8,024,266 B1* | 9/2011 | Barber | G06Q 20/10 705/37 |
| 8,042,149 B2* | 10/2011 | Judge | H04L 63/14 726/1 |
| 8,069,481 B2* | 11/2011 | Judge | H04L 63/0245 726/22 |
| 8,086,684 B2* | 12/2011 | Hayes | G06Q 10/00 709/203 |
| 8,095,612 B2* | 1/2012 | Cowan | G06F 15/16 709/207 |
| 8,095,613 B1* | 1/2012 | Perkowitz | G06Q 10/109 709/207 |
| 8,117,265 B2* | 2/2012 | Ben-Yoseph | H04L 51/043 709/206 |
| 8,180,834 B2* | 5/2012 | Kay | H04L 51/12 709/203 |
| 8,214,437 B1* | 7/2012 | Alspector | H04L 51/12 709/206 |
| 8,214,490 B1 | 7/2012 | Vos et al. | |
| 8,224,905 B2* | 7/2012 | Bocharov | G06Q 10/107 709/206 |
| 8,255,468 B2* | 8/2012 | Vitaldevara | G06Q 10/107 709/206 |
| 8,312,096 B2* | 11/2012 | Cohen | H04L 51/26 709/207 |
| 8,423,458 B2* | 4/2013 | Barber | G06Q 20/10 705/39 |
| 8,427,673 B2* | 4/2013 | Yamaguchi | H04N 1/00244 358/1.15 |
| 8,452,715 B2* | 5/2013 | Barber | G06Q 20/10 705/400 |
| 9,087,324 B2* | 7/2015 | Osipkov | G06Q 10/107 |
| 9,183,535 B2* | 11/2015 | Eustice | G06Q 10/10 |
| 9,262,751 B1 | 2/2016 | Wheeler | |
| 9,954,810 B2* | 4/2018 | Osipkov | G06Q 10/107 |
| 10,263,935 B2* | 4/2019 | Osipkov | H04L 67/306 |
| 2001/0049725 A1* | 12/2001 | Kosuge | G06Q 10/107 709/206 |
| 2002/0083140 A1* | 6/2002 | Shin | G06Q 30/0277 709/206 |
| 2002/0133557 A1* | 9/2002 | Winarski | G06Q 10/107 709/207 |
| 2003/0204569 A1* | 10/2003 | Andrews | H04L 51/12 709/206 |
| 2004/0006598 A1* | 1/2004 | Bargagli Damm | G06Q 30/02 709/206 |
| 2005/0060643 A1* | 3/2005 | Glass | G06F 40/169 715/205 |
| 2005/0182735 A1* | 8/2005 | Zager | G06Q 20/04 705/67 |
| 2006/0085504 A1* | 4/2006 | Yang | H04L 51/12 709/206 |
| 2006/0168029 A1* | 7/2006 | Fitzpatrick | G06Q 10/107 709/206 |
| 2007/0016609 A1* | 1/2007 | Kim | G06F 16/35 |
| 2007/0214227 A1* | 9/2007 | Quinn | G06Q 30/0255 709/206 |
| 2008/0147813 A1* | 6/2008 | Damm | H04L 51/34 709/206 |
| 2009/0125600 A1* | 5/2009 | Fitzpatrick | G06Q 10/107 709/206 |
| 2009/0210391 A1* | 8/2009 | Hall | G06F 16/24578 |
| 2010/0030865 A1* | 2/2010 | Jiang | G06Q 10/107 709/207 |
| 2010/0058058 A1* | 3/2010 | Busari | G06F 21/445 713/169 |
| 2010/0191819 A1* | 7/2010 | Alspector | G06Q 10/107 709/206 |
| 2011/0055294 A1* | 3/2011 | Noma | G06F 16/2379 707/813 |
| 2011/0131085 A1* | 6/2011 | Wey | G06Q 30/0214 705/14.16 |
| 2011/0191847 A1* | 8/2011 | Davis | H04L 63/1425 726/22 |
| 2011/0258218 A1* | 10/2011 | Hayes | G06Q 10/107 707/769 |
| 2011/0258264 A1* | 10/2011 | Bremner | G06Q 10/107 709/206 |
| 2012/0079099 A1* | 3/2012 | Dhara | G06Q 10/107 709/224 |
| 2012/0116559 A1* | 5/2012 | Davis | G06F 3/04886 700/94 |
| 2012/0134548 A1* | 5/2012 | Rhoads | G06F 9/445 382/118 |
| 2012/0166179 A1* | 6/2012 | Tirumalachetty | G06F 40/258 704/9 |
| 2012/0198010 A1* | 8/2012 | Bremner | G06Q 10/107 709/206 |
| 2013/0007152 A1* | 1/2013 | Alspector | H04L 51/12 709/206 |

* cited by examiner

MESSAGE CATEGORIZATION

RELATED APPLICATION

This application is a continuation of and claims priority to U.S. application Ser. No. 15/922,906, filed on Mar. 15, 2018, entitled "MESSAGE CATEGORIZATION", which claims priority to U.S. application Ser. No. 14/803,752, filed on Jul. 20, 2015, entitled "MESSAGE CATEGORIZATION", which claims priority to U.S. application Ser. No. 13/180,838, filed on Jul. 12, 2011, entitled "MESSAGE CATEGORIZATION", all of which are incorporated by reference herein in their entireties.

BACKGROUND

Today, many individuals and commercial entities utilize electronic communication mediums for communication. For example, users may communicate through instant message applications, email, text messages, etc. Communication messages may be sent for a variety of purposes, such as personal messages, newsletters, commercial advertisements, social network messages, job alerts, and/or a plethora of other purposes. Unfortunately, a user's experience with electronic communication may be diminished because the user may be overwhelmed with large quantities of messages. For example, a user's email inbox may be inundated with hundreds of emails a week that the user may or may not have the time and/or interest in reading. Thus, the user may inadvertently overlook interesting emails while attempting to sift through their email inbox. Current techniques may allow a user to manually setup rules to place message into folders created by the user. Unfortunately, many users may not take advantage of message processing rules because of the complexity involved in setting up such rules. Other techniques may provide spam filters that specifically target spam messages. However, such techniques may not detect, categorize, and/or organize other types of messages.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for defining a message behavior profile for categorizing messages are disclosed herein. A message behavior profile may be defined for a sender based upon a variety of observed features associated with the sender, recipients, message content, interactions between the sender and recipients, and/or other behavioral features (e.g., message sending patterns, how recipients react to messages, etc.). The message behavior profile may be indicative of the type of messages the sender may send (e.g., the sender may have a tendency to send spam, personal messages, job alerts, social network updates, newsletters, commercial messages, etc.). In this way, the message behavior profile and/or other information (e.g., features extracted from a current message) may be used to categorize messages from the sender in advance and/or in real-time. Additionally, messages behavior profiles may be associated with senders based upon IP address, an IP address range, sending domain, an unsubscription email address, a session initiation protocol address, a DNS server, a user account, a digital certificate (e.g., DKIM, PGP, digital certificate signer), a phone number, etc. Thus, a sender may be identified with particularity even though the sender may have multiple and/or ambiguous sender email addresses (e.g., a spammer may attempt to conceal the spammer's identity by hiding behind multiple email addresses from a single IP address).

In one example of defining a message behavior profile, one or more message read rates may be specified within the message behavior profile. A message read rate may correspond to a number of messages from the sender read by a recipient compared to (e.g., ratio) a number of messages received (by that recipient) from the sender (e.g., if a recipient reads messages of the sender at a high frequency, then such messages of the sender may be deemed personal; if a recipient rarely reads message of the sender (but reads messages from other senders), then such messages of the sender may be deemed non-personal; etc.). In another example of defining the message behavior profile, one or more message response rates may be specified within the message behavior profile. A message response rate may correspond to a number of recipients that responded, replied, saved, forwarded, etc. a message sent by the sender, for example. Accordingly, as used herein response rate and/or the like is not intended to be limited to actually responding to (the sender of) a message, but may also comprise other actions as well (e.g., that are not directly responsive (to the sender)), such as saving, forwarding and/or editing, etc., for example. In another example of defining a message behavior profile, one or more message distribution patterns may be specified within the message behavior profile. It may be appreciated that a message distribution pattern may correspond to various message volume patterns, sending frequency patterns, and/or other patterns. For example, a message distribution pattern may correspond to a number of distinct messages sent by the sender to recipients (e.g., a message campaign of the sender may indicate that the sender distributes similar messages to a large number of recipients at similar times, which may indicate that the sender has a tendency to send bulk non-personalized newsletters to recipients).

It may be appreciated that a variety of other features may be specified within the message behavior profile. In one example, an unsubscription feature may be specified within the message behavior profile. The unsubscription feature may correspond to a number of messages comprising an unsubscription option sent by the sender (e.g., if a sender sends messages with an unsubscription features above a predetermined threshold, then the unsubscription features may indicate that the sender has a tendency to send newsletters and/or commercial advertisements to recipients). In another example, a message variance feature may be specified within the message behavior profile. The message variance feature may be specified by computing a fuzzy signature for one or more messages associated with the sender. For example, hash values may be computed from message content, such that messages that differ slightly may result in similar hash values, whereas messages with different content may result in different hash values. The message variance feature may be indicative of message content variance across messages sent by the sender (e.g., dissimilar hash values may indicate that the sender may have a tendency to send unique personalized messages, such as personal emails, whereas similar hash values may indicate that the sender has a tendency to send similar messages, such as newsletters, etc, that merely comprise a different "to" or "addressee" entry, for example).

It may be appreciated that a variety of sender behavior patterns may be leveraged when defining the message behavior profile. For example, the timing of when and/or how the sender sends messages may be used to determine the type of messages the sender may have a tendency to send. In one example, the sender may send a burst of messages to a plurality of recipients at a similar time, which may indicate that the messages are newsletters as opposed to personal messages. In another example, the sender may send messages at regular intervals (e.g., Monday mornings), which may indicate the messages are newsletters as opposed to personal messages. In another example, variance in the number of messages received across recipients may be used to define the message behavior profile. It may be appreciated that other sender behavior patterns may be used to define the message behavior profile, and that merely a few examples are set forth and that the claimed subject matter is not meant to be limited to merely the examples set forth herein.

In this way, the message behavior profile may be defined for the sender. The message behavior profile may be indicative of the type of messages sent by the sender. Thus, the message behavior profile may be utilized in categorizing messages from the sender. Categorizing messages may enhance a user's communication experience by grouping similar categories of messages into folders, providing message viewing panels tailored for various categorizes of messages and/or applying particular rules and/or actions to messages based upon their category (e.g., a clean-up policy may remove newsletter messages from an inbox after 10 days, but does not affect other categories of messages), etc. It may be appreciated that a message may be categorized regardless of whether a message behavior profile exits for a sender. For example, a message may be categorized in real-time (e.g., upon receipt of the email, but before delivery of the email into a recipient inbox) based upon features extracted from the message (e.g., metadata and/or message content such as a URL, advertisement, image, HTML structure, text, download link, etc.). If a message behavior profile exists, then the extracted features may be used to supplement the categorization of a message from the sender. If a message behavior does not exist, then the extracted features may be used to categorize the message.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
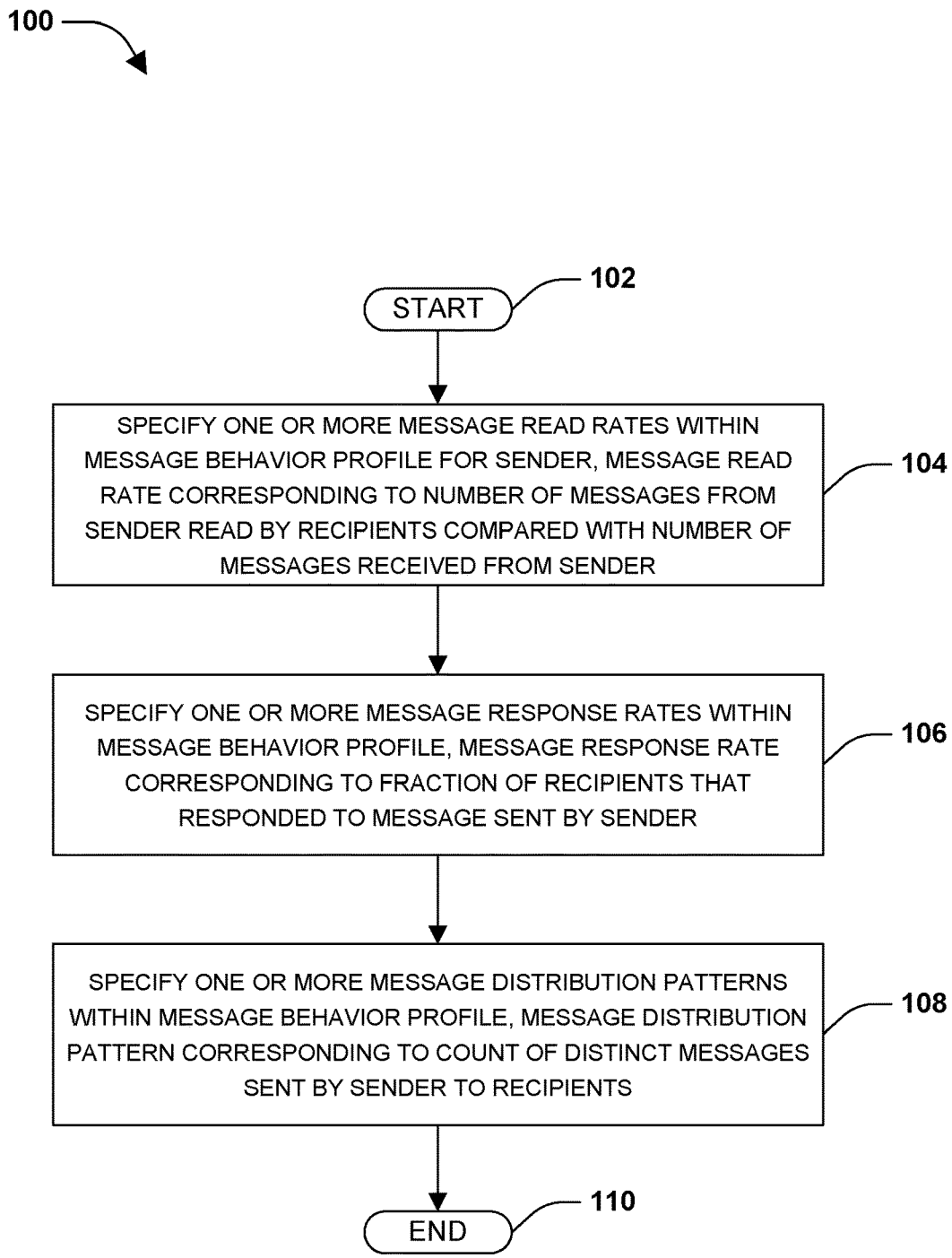
FIG. 1 is a flow chart illustrating an exemplary method of defining a message behavior profile for a sender.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many users of electronic communication mediums are inundated with messages on a daily basis. For example, a user may engage in numerous text message and/or instant message conversations a day. In addition, the user may also receive hundreds of email messages a week. Unfortunately, the user may not have the time, resources, and/or desire to sift through hundreds of messages to locate interesting messages. For example, a user may have a high interest in personal emails and social network updates; a medium interest in certain newsletters, commercial advertisements, and alerts; and a low interest in other newsletters and commercial advertisements that were not specifically subscribed to by the user; and zero interest in spam. The user may receive a plethora of messages spanning the range of uninteresting to highly interesting. Because the user may receive a large volume of messages, many of the interesting messages may be overlooked amongst the uninteresting messages. Current solutions may allow a user to customize message delivery manually. In particular, the user may direct messages from a specific sender to folder separate from a user inbox. However, such solutions merely take into account the specific sender defined within the message processing rule, and may not attempt to intelligently process messages from other undefined senders. In particular, current message processing solutions may not attempt to intelligently process messages from undefined senders based upon behavior patterns of the sender (e.g., if a sender sends similar emails in bulk at similar times, then the sender may be sending non-personal newsletters; if the sender sends dissimilar messages infrequently, the sender may be sending personal messages; etc.). Additionally, current message processing solutions may not take into account recipient behavior (e.g., if a majority of recipients read messages from the sender, then the sender may be sending interesting messages; if a majority of recipients respond to messages from the sender, then the sender may be sending personal messages; etc.).

Accordingly, one or more systems and/or techniques for defining a message behavior profile that may be used for categorizing messages are disclosed herein. In particular, sender behavior patterns, recipient interaction patterns, and/or other features may be used to define a message behavior profile for a sender. The message behavior profile may be indicative of the categories/types of messages sent by the sender (e.g., a distribution of probabilities indicating likelihoods that messages of a sender correspond to various categories; a single overall category corresponding to messages of the sender; etc.). The message behavior profile and/or features extracted from a message may be used to categorize the message from the sender. In this way, a user's experience with a message user interface may be enhanced by providing additional features and/or options based upon categories of messages. For example, messages from a sender may be categorized as newsletters based upon a message behavior profile of the sender, and thus may be placed into a particular folder, displayed within a particular view, and/or processed in accordance with message processing polices defined for newsletters.

One embodiment of defining a message behavior profile is illustrated by an exemplary method 100 in FIG. 1. At 102, the method starts. At 104, one or more message read rates may be specified within a message behavior profile for a sender. A message read rate may correspond to a number of messages from the sender read by recipients compared with a number of messages received (by the recipients) from the sender (e.g., a number of messages from a sender read by the recipient over a predefined time period; a number of messages from the sender read by the recipient compared with a total number of messages received from the sender over a predefined time period; etc.).

In one example of a message read rate, a recipient may read a percentage of messages from the sender above a predetermined threshold (e.g., the recipient may read 60% of messages received from the sender). Such recipient behavior may indicate that messages from the sender are interesting (e.g., personal messages, social network updates, online bill payment notifications, desired job alerts, etc.). In another example of a message read rate, a recipient may read a percentage of messages from the sender below a predetermined threshold (e.g., the recipient may read less than 15% of messages received from the sender). Such recipient behavior may indicate that messages from the sender are not interesting (e.g., unsolicited newsletters, commercial advertisements, etc.). It may be appreciated that other recipient behaviors corresponding to message read rates may be indicative of a wide variety of message categories, and that merely a few examples are set forth and that the claimed subject matter is not meant to be limited to merely the examples set forth herein.

At 106, one or more message response rates may be specified within the message behavior profile. A message response rate may correspond to a number of recipients that responded, replied, forwarded, saved, etc. a message sent by the sender. In one example of a message response rate, recipients may read messages from a sender above a predetermined threshold (e.g., above 15%), but may respond to the sender below a predetermined threshold (e.g., below 5%). Such a recipient behavior may indicate that messages from the sender are newsletters, commercial advertisements, job alerts, social network updates, etc., as opposed to personal emails, which may generally lend themselves to conversations comprising back and forth message communication with a higher response rate (e.g., above 50%). It may be appreciated that other recipient behaviors corresponding to message response rates (e.g., a message response rate based upon a rate at which messages from the sender are forwarded to other users; a message response rate based upon a time span between receipt of a message and an action taken upon the message, such as deletion, reply, forward, save, etc.; a message response rate based upon actions taken upon message from the sender, such as deletion, reply, forward, save, etc.; etc.) may be indicative of a wide variety of message categories, and that merely a few examples are set forth. Accordingly, response rate and/or the like as used herein, including as regards the scope of the appended claims, is not meant to be limited to a response or responses per se to one or more messages.

At 108, one or more message distribution patterns may be specified within the behavior profile. It may be appreciated that a message distribution pattern may related to a variety of patterns corresponding to how the sender sends messages (e.g., volume, frequency, similarity in message content, similarity in message send times, similarity in message send times across various recipients, average number of recipients for messages and/or a variety of other metrics and/or comparisons of metrics). For example, a message distribution pattern may correspond to a number of distinct messages sent by the sender to recipients. In one example of a message distribution pattern, a sender may send a number of emails above a predetermined threshold (e.g., 20 similar emails that are emailed at one time to 20 recipients) at regular intervals (e.g., once a day). Such sender behavior may indicate that messages from the sender are newsletters, commercial advertisements, etc. It may be appreciated that other sender behaviors corresponding to message distribution patterns may be indicative of a wide variety of message categories, and that merely a few examples are set forth.

It may be appreciated that other features (e.g., features extracted from a message, variance in message content between messages sent to various recipients, etc.) may be taken into account when defining the message behavior profile. In one example of defining the message behavior profile, an unsubscription feature maybe specified within the message behavior profile. The unsubscription feature may correspond to a number of messages comprising an unsubscription option (e.g., an unsubscribe link within an email) sent by the sender. If the unsubscription feature indicates that the sender sends messages with an unsubscription option above a predetermined threshold (e.g., 50% of messages comprise an unsubscription option), then the subscription feature may indicate that the sender has a tendency to send newsletters, commercial advertisements, and/or other subscription based messages, as opposed to personal messages, transaction messages (e.g., receipts), and/or other non-subscription messages. It may be appreciated that an unsubscription feature may be indicative of a wide variety of message categories, and that merely a few non-limiting examples are set forth.

In another example of defining the message behavior profile, a message variance feature may be specified by computing a fuzzy signature for one or more messages associated with the sender. The message variance feature may be indicative of content variance across messages sent by the sender (e.g., an amount of change in email content, such as text, between a first message sent to a first recipient and a second email sent to a second recipient at a similar time). In one example, a fuzzy signature may be computed by calculating hash values from message content for one or more messages. Messages with similar hash values may be deemed to have similar content (e.g., message content may be duplicated between messages; message content may vary merely in salutations). If the sender sends messages with similar fuzzy signatures (e.g., messages with similar hash values) at similar times to recipients, then the fuzzy signatures may indicate that the sender has a tendency to send newsletters, commercial advertisements, and/or other non-personalized messages In contrast, if the sender sends messages with different fuzzy signatures (e.g., messages with different hash values) at similar times to recipients, then the fuzzy signatures may indicate that the sender has a tendency to send personalized emails, such as alerts.

It may be appreciated that one or more categories corresponding to the sender may be specified within the message behavior profile of the sender. The one or more categories (e.g., a single category, multiple categories and/or a probability distribution of categories, etc.) may be based upon message read rates, message response rates, message distribution patterns, unsubscription features, message variance features and/or a variety of other features associated with the sender, messages from the sender, recipient interactions with messages from the sender and/or message content, etc. In this way, the message behavior profile may be used to categorize messages from the sender. For example, a message may be categorized in real-time before delivery of the message so that additional processing may be performed on the message. Such processing may enhance the recipient's experience with message communication (e.g., newsletters may be placed into a newsletter folder, social network updates may be displayed or hidden based upon a view setting, and/or alert messages may be deleted after one week; etc.). At 110, the method ends.

Figure 2:
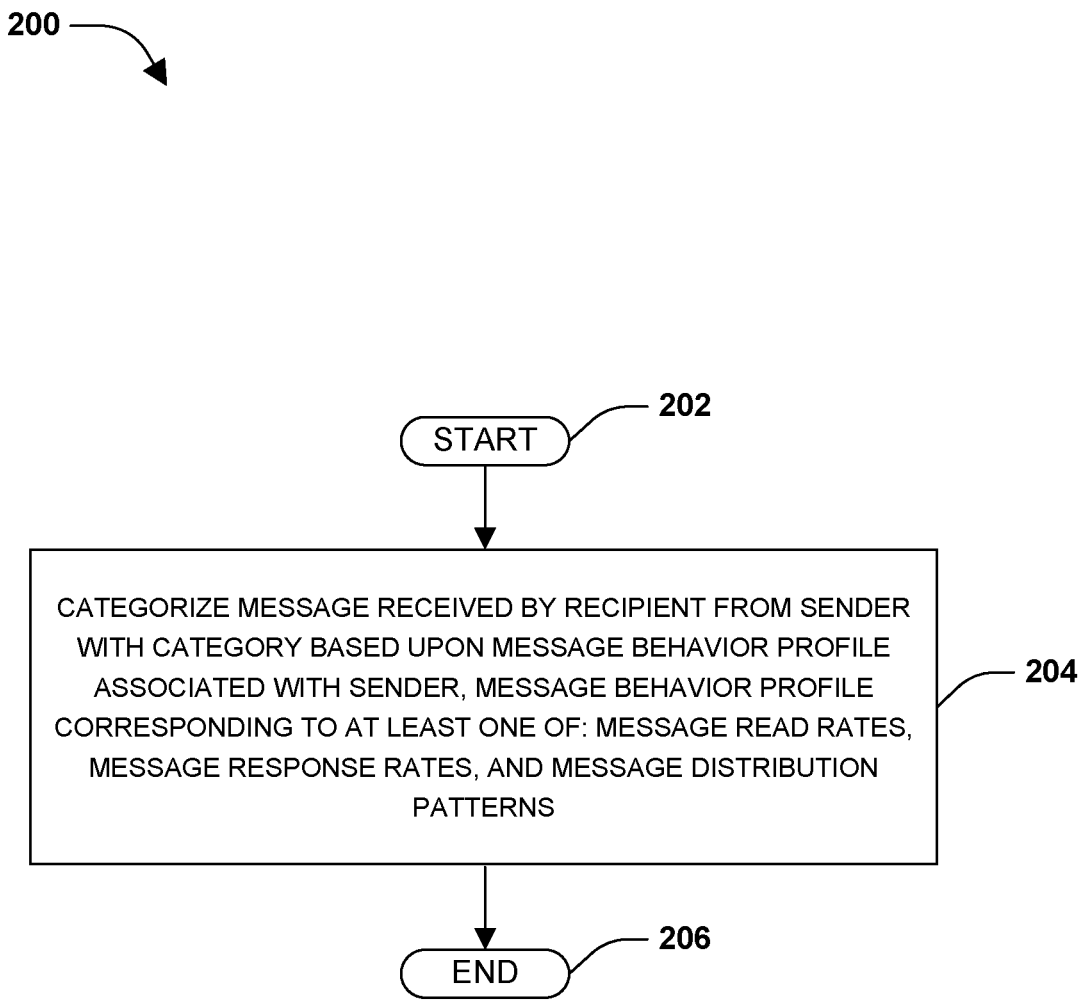
FIG. 2 is a flow chart illustrating an exemplary method of categorizing messages.

One embodiment of categorizing messages is illustrated by an exemplary method 200 in FIG. 2. At 202, the method starts. It may be appreciated that a message from a sender may be categorized based upon extracted features/content of the message and/or a message behavior profile of the sender. The sender may be identified based upon an IP address, an IP address range, a from message address, a sending domain, an unsubscribe email address, a session initiation protocol address, a DNS server, a user account, a digital certificate, a phone number and/or other identification. In this way, a sender, such as a spammer, may be identified notwithstanding the sender using alternative sending addresses (e.g., in contrast to conventional techniques that may be circumvented by a nefarious sender that may "hide" behind different, rotating, etc. addresses). At 204, a message received by a recipient from a sender may be categorized into a category based upon a message behavior profile associated with the sender (e.g., the message may be categorized in real-time before delivery of the message to the recipient). The message behavior profile may correspond to message read rates, message response rates, and/or message distribution patterns. A message read rate within the message behavior profile may have been specified based upon prior interactions of recipients with messages from the sender (e.g., how often recipients read messages from the sender, how often recipients read messages from the sender compared with how often the recipients read messages from other senders, etc.). A message response rate within the message behavior profile may have been specified based upon prior interactions of recipients with messages from the sender (e.g., how often recipients responded, replied, forwarded, saved, etc. messages from the sender). A message distribution pattern within the message behavior profile may have been specified based upon prior sending patterns of the sender (e.g., volume, frequency and/or other patterns of messages sent by the sender)

The message behavior profile may correspond to unsubscription features. An unsubscription feature within the message behavior profile may have been specified based upon a number of messages comprising an unsubscription option sent by the sender. It may be appreciated that an unsubscription feature parsed from the message received by the recipient from the sender may be used to categorize the message (e.g., the message behavior profile may indicate that the sender has a tendency to send personal emails, however, the current email may comprise an unsubscription option that may be used to categorize the current email as a newsletter).

The message behavior profile may correspond to message variance features. A message variance feature specified within the message behavior profile may have been specified based upon fuzzy signatures of one or more messages. The fuzzy signatures may be indicative of content variance across message sent by the sender (e.g., messages with similar fuzzy signatures, such as similar hash values, may be deemed to have similar message content, and thus may be deemed as non-personalized messages; message with dissimilar fuzzy signatures, such as dissimilar hash values, may be deemed to have dissimilar message content, and thus may be deemed as personalized messages (e.g., particularly if they are read and/or responded to as well); etc.). It may be appreciated that a fuzzy signature computed from the message received by the recipient may be used to categorize the message (e.g., if the fuzzy signature is similar to fuzzy signatures of other messages sent by the sender, then the message may be deemed as non-personalized).

The message behavior profile may comprise one or more categories specified for the sender. That is, one or more categories may have been specified for the sender based upon message read rates, message response rates, message distribution patterns, unsubscription features, message variance features and/or a variety of other features and/or content associated with prior messages sent by the sender. In this way, messages from the sender may be efficiently categorized using the one or more categories specified for the sender within the message behavior profile (e.g., as opposed to performing a computationally intensive analysis of the message received by the recipient from the sender, a category may be quickly assigned to the message from the one or more categories specified within the message behavior profile of the sender).

In some instances a message behavior profile may not exist for a sender, while in other instances a message behavior profile for a sender may be based upon sparse and/or incomplete data (e.g., categorization data may be based upon ten prior messages associated with a sender as opposed to categorization data based upon thousands of prior messages). In one example, the message may be categorized based upon one or more features (e.g., URL, text, advertisements, images, HTML structure, download links, etc.) extracted from the message regardless of whether a message behavior profile exists for the sender. In another example, the message may be categorized based upon one or more features and/or content extracted from the message in real-time if a message behavior profile does not exist for the sender.

In one example of categorizing the message using the message behavior profile, the sender of the message may be identified. The sender identification may be used to locate (e.g., lookup within a message behavior profile database) the message behavior profile corresponding to the sender. The message behavior profile may specify one or more message read rates, one or more message response rates, one or more message distribution patterns and/or features specified for the sender. Such features may be used to categorize the message. For example, an aggregate of the one or more message read rates may indicate that messages of the sender are read by recipients below a predetermined read rate (e.g., 10% of messages from the sender are read by recipients). An aggregate of the one or more message response rates may indicate that messages of the sender are responded to by recipients below a predetermined response rate (e.g., 4% of recipients reply, forward, and/or take other actions associated with messages from the recipient). An aggregate of one or more message distribution patterns may indicate that the sender is a bulk message sender of similar messages sent at similar times (e.g., the sender typically sends about 500 messages with the similar content (e.g., similar hash values) at the same or similar time(s) and/or the sender typically sends messages to a set of 500 recipients at regular weekly intervals, etc.). In this way, the message may be categorized with a newsletter category and/or a commercial advertisement category. It may be appreciated that additional features, such as unsubscription features, may be used when categorizing the message. It may be appreciated that features and/or content extracted from the message may be used when categorizing the message.

In another example of categorizing the message using the message behavior profile, the sender of the message may be identified. The sender identification may be used to locate the message behavior profile corresponding to the sender. The message behavior profile may specify one or more message response rates, one or more message distribution patterns and/or other features specified for the sender. Such features may be used to categorize the message. For example, an aggregate of the one or more message response rates may indicate that messages of the sender are responded to by recipients below a predetermined response rate (e.g., less than 10% of recipients reply to messages of the sender). An aggregate of the one or more message distribution patterns may indicate that the sender is a bulk message sender of dissimilar messages (e.g., the sender may typically send about 500 dissimilar messages at similar times to recipients at regular weekly intervals, where the messages are personalized for the respective recipients). In this way, the message may be categorized with an alert category (e.g., spam, job alert, bank statement alert, etc.).

An aggregate of one or more message distribution patterns may indicate that messages from the sender vary in volume and frequency between recipients above a predetermined variance threshold (e.g., the sender may frequently send social network update messages to a first recipient based upon the first recipient interacting with the social network on a daily basis, but may infrequently send social network update messages to a second recipient based upon that second recipient interacting with the social network a few times a week). In this way, the message may be categorized with a social network category. It may be appreciated that additional features, such as unsubscription features, may be used when categorizing the message. It may be appreciated that features and/or content extracted from the message may be used when categorizing the message.

It may be appreciated that categories with which a message does not match may be used to (indirectly) categorize the message (e.g., a process of elimination may be performed to categorize a message). For example, if an aggregate of message read rates of the sender are below a predetermined threshold, an aggregate of message response rates of the sender are below a predetermined threshold, and the message does not match an alert category, then the message may be categorized as a newsletter.

After categorization, the message may be processed and/or delivered into a message user interface of the recipient (e.g., an email application; a text message application of a cell phone; etc.). In one example, the message may be organized into a folder corresponding to the category of the message. In another example the message may be presented within a view corresponding to the category (e.g., the message may be displayed or hidden within an inbox of the message user interface based upon a view option selection). In another example, an action may be performed upon the message. The action may be associated with a user defined message processing policy corresponding to the category. For example, the user may specify a clean-up policy for a particular category of messages, such that messages assigned to the category may be deleted after a user defined period of time. At 206, the method ends.

Figure 3:
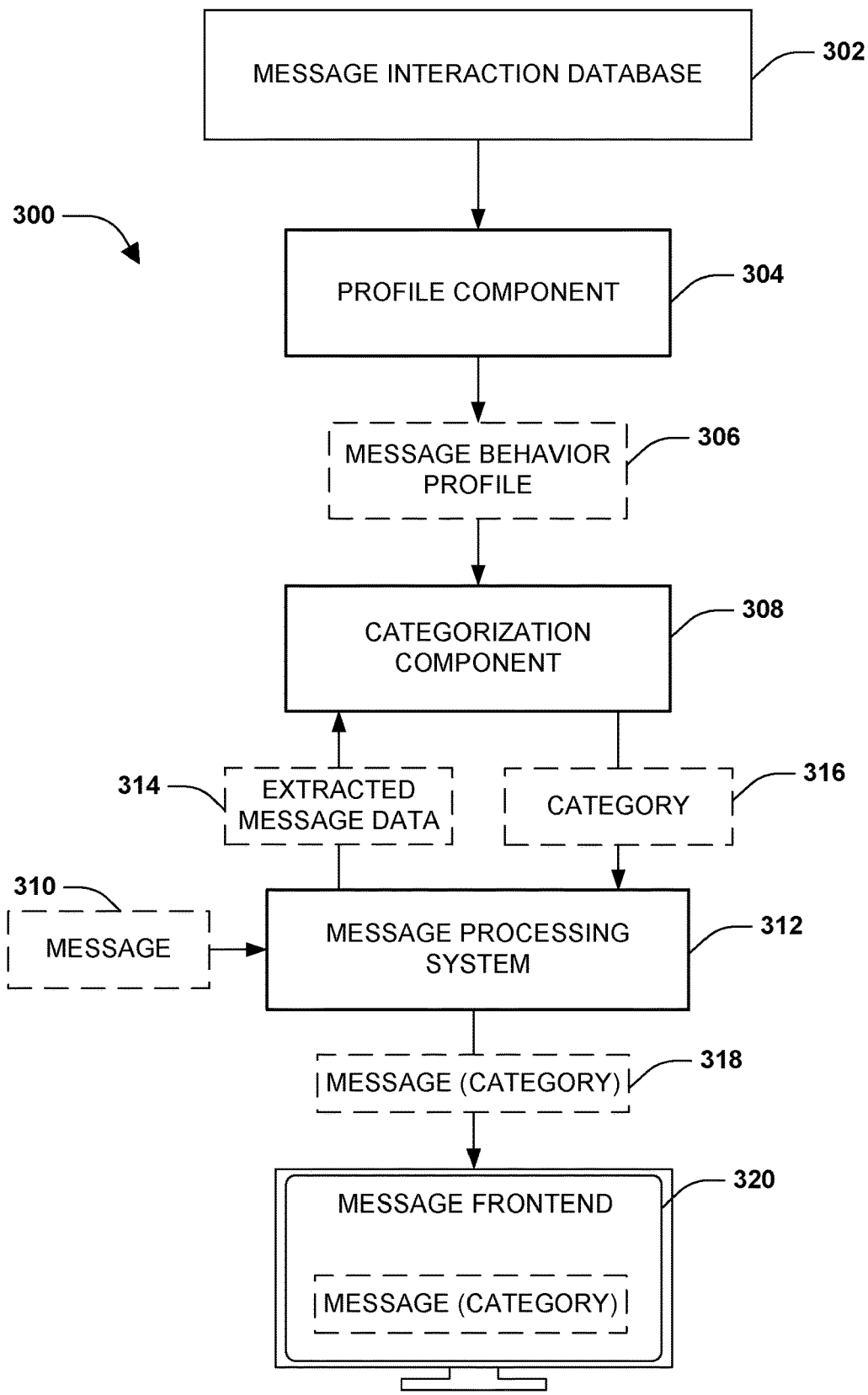
FIG. 3 is a component block diagram illustrating an exemplary system for defining a message behavior profile for a sender.

FIG. 3 illustrates an example of a system 300 configured for defining a message behavior profile 306 for a sender. The system 300 may comprise a profile component 304 and/or a categorization component 308. The profile component 304 may define the message behavior profile 306 based upon prior message data within a message interaction database 302. For example, sender message distribution patterns, recipient interact patterns, extracted message features and/or other message information associated with the sender may be used to define the message behavior profile 306.

The profile component 304 may be configured to specify one or more message read rates within the message behavior profile 306 for the sender. A message read rate may correspond to a number of messages from the sender read by recipients compared with a number of messages received (by the recipients) from the sender. The profile component 304 may be configured to specify one or more message response rates within the message behavior profile 306. A message response rate may correspond to a number of recipients that responded to a message sent by the sender. The profile component 304 may be configured to specify one or more message distribution patterns. A message distribution pattern may correspond to a number of distinct messages sent by the sender to recipients. In one example, a message distribution pattern may indicate that the sender has a tendency to send a large number, such as 500, of messages to recipients at the same time, where the messages comprise similar message content, and thus the sender may be deemed to send non-personalized newsletters and/or commercial advertisements. In another example, a message distribution pattern may indicate that the sender has a tendency to send a large number, such as 500, of messages to recipients over a short time span, such as 1 minute, where the messages comprise dissimilar message content, and thus the sender may be deemed to send personalized alerts.

The profile component 304 may be configured to specify other features within the message behavior profile 306. For example, the profile component 304 may specify an unsubscription feature within the message behavior profile 306. The unsubscription feature may correspond to a number of messages comprising an unsubscription option sent by the sender. The profile component 304 may be configured to specify one or more categories for the sender within the message behavior profile 306. The one or more categories may be indicative of the types of messages sent by the sender. In this way, messages from the sender may be categorized using the message behavior profile 306 and/or extracted features from such messages.

The categorization component 308 may be configured to categorize a message 310 from the sender into a category based upon the message behavior profile 306. The categorization component 308 may be associated with a message processing system 312. The message processing system 312 may be configured to process messages for a message frontend 320 (e.g., an email application). For example, the message processing system 312 may receive and/or send messages for the message frontend 320. The message processing system 312 may receive the message 310. The categorization component 308 may extract message data (e.g., extracted message data 314) from the message. For example, the extracted message data 314 may comprise a sender identification and/or extracted features and/or content of the message. The categorization component 308 may determine that the message behavior profile 306 is associated with the sender based upon the sender identification. The categorization component 308 may determine a category 316 for the message 310 based upon the message behavior profile 306 and/or the extracted features. The categorized message 318 may be processed and/or delivered to the message frontend 320. For example, the categorized message 318 may be organized into a particular folder and/or may be displayed or hidden within an inbox based upon the category of the message.

It may be appreciated that the categorization component 308 may be configured to categorize a message even though a message behavior profile may not exist for a sender of the message. In one example, the categorization component 308 may be configured to categorize a message from a second sender for which a message behavior profile does not exist. For example, the categorization component 308 may categorize the message based upon features and/or extracted from the message.

Figure 4:
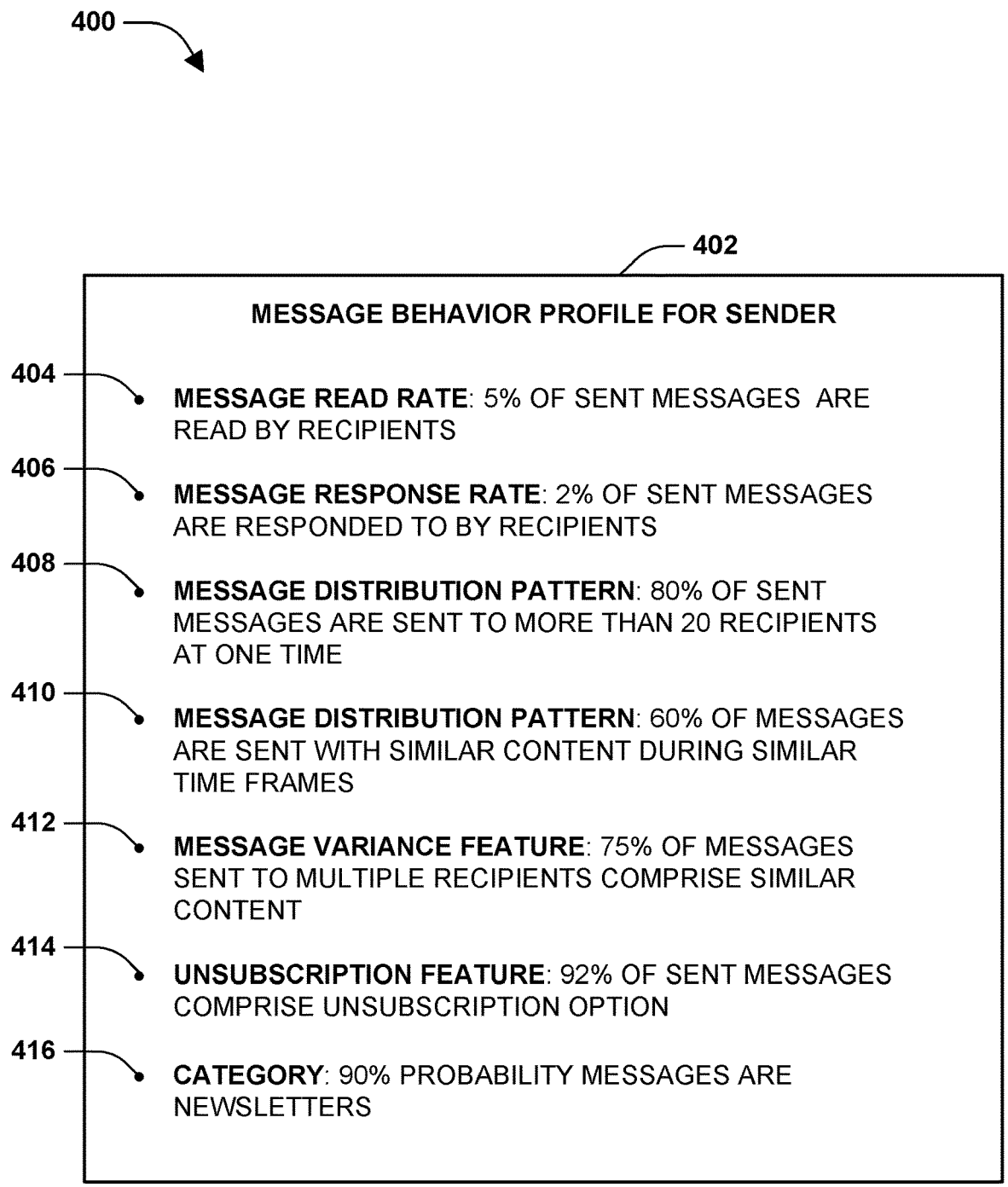
FIG. 4 is an illustration of an example of message behavior profile for a sender.

FIG. 4 illustrates an example 400 of a message behavior profile 402 for a sender. The message behavior profile 402 may comprise a message read rate 404. For example, the message read rate 404 may indicate that 5% of messages sent by the sender are read by recipients. It may be appreciated that the message read rate 404 may be based upon other factors (e.g., a number of messages from the sender that are read by recipients over a particular timespan, such as 3 days, compared with a number of messages sent to the recipients by the sender over that particular (3 day) time span, etc.). The message behavior profile 402 may comprise a message response rate 406. For example, the message response rate 406 may indicate that 2% of messages sent by the sender are responded to by recipients. It may be appreciated that the message response rate 406 may be based upon other factors (e.g., a percentage of recipients that reply to messages from the recipient, a percentage of recipients that forward messages from the recipient, communication (such as a new message) from the recipient to the sender which may or may not be associated with a message received (by the recipient) from the sender, etc.).

The message behavior profile 402 may comprise a message distribution pattern 408. For example, the message distribution pattern 408 may indicate that 80% of messages sent by the sender are sent to more than 20 recipients at a single time. The message behavior profile 402 may comprise a message distribution pattern 410. For example, the message distribution pattern 410 may indicate that 60% of messages are sent with similar content during similar time frames to recipients. It may be appreciated that the message distribution pattern 408 and/or the message distribution pattern 410 may be based upon other factors (e.g., volume, frequency and/or other sending patterns).

The message behavior profile 402 may comprise a message variance feature 412. For example, the message variance feature 412 may indicate that 75% of messages sent by the sender to multiple recipients may comprise similar content. It may be appreciated that the message variance feature 412 may be based upon other features (e.g., fuzzy signatures, variance in message content amongst messages to a single recipient over time from the sender and/or variance in message content amongst messages to multiple recipients sent at the same time, variance in volume and/or time across recipients (e.g., a recipient receiving a large number of messages from a sender at irregular times compared with other recipients may indicate that the messages are social network updates), etc.). The message behavior profile 402 may comprise an unsubscription feature 414. For example, the unsubscription feature 414 may indicate that 92% of messages sent by the sender comprise an unsubscription option. The message behavior profile 402 may comprise a category 416. For example, the category 416 may indicate that there may be a 90% probability that messages sent by the sender may be newsletters. In this way, the message behavior profile may be used to categorize messages of the sender.

Figure 5:
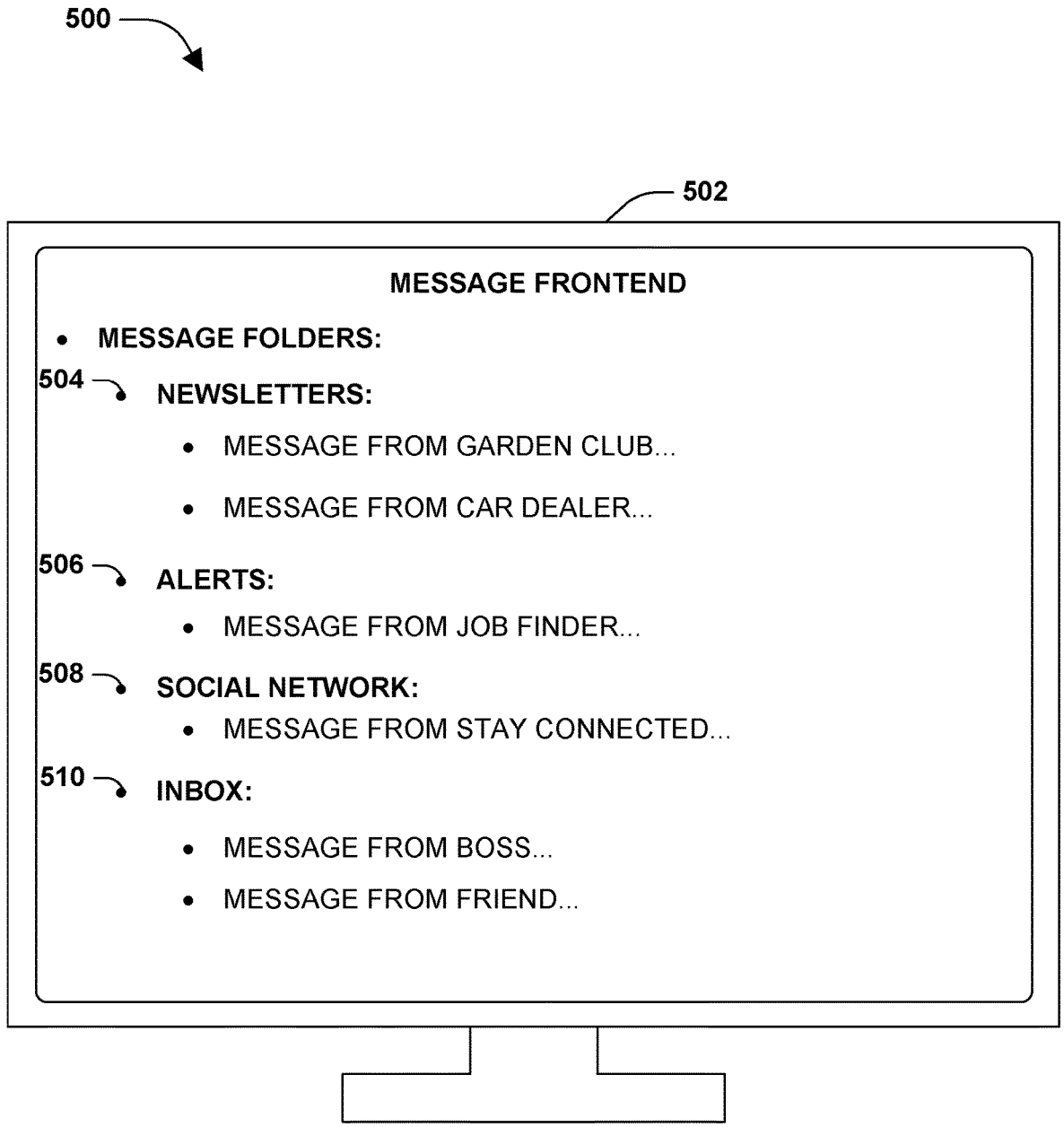
FIG. 5 is an illustration of an example of organizing messages into folders within a message frontend based upon categories of the messages.

FIG. 5 illustrates an example 500 of organizing messages into folders within a message frontend 502 based upon categories of the messages. A user may utilize the message frontend 502 for message communication. For example, the message frontend 502 may generally display messages for the user within an inbox. Unfortunately, the inbox may be inundated with a large number of emails that may or may not interest the user. Accordingly, messages may be categorized and organized into corresponding folders. In one example, a garden club message from a garden club sender may be categorized as a newsletter based upon a message behavior profile for the garden club sender. A car dealer message from a car dealer sender may be categorized as a newsletter based upon a message behavior profile for the car dealer sender. In this way, the garden club message and/or the car dealer message may be organized into a newsletters folder 504.

In another example, a job finder message from a job finder sender may be categorized as an alert based upon a message behavior profile for the job finder sender. In this way, the job finder message may be organized into an alerts folder 506. In another example, a stay connected message from a social network sender may be categorized as a social network message based upon a message behavior profile for the social network sender. In this way, the stay connected message may be organized into a social network folder 508. In another example, a work message from a boss sender may be categorized as a personal message based upon a message behavior profile for the boss sender. A social message from a friend sender may be categorized as a personal message based upon a message behavior profile for the friend sender. In this way, the work message and/or the social message may be organized into the inbox 510.

Figure 6:
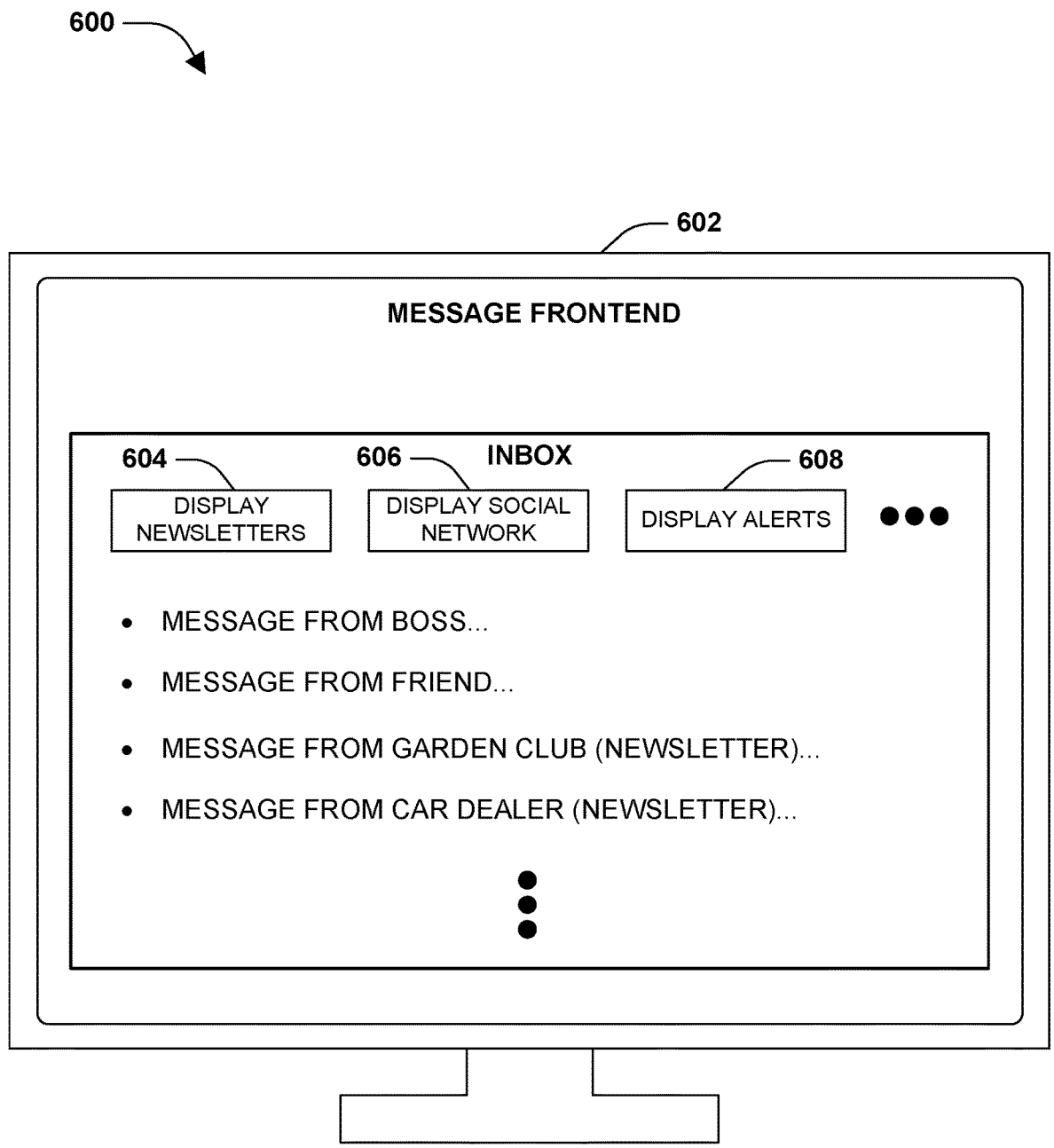
FIG. 6 is an illustration of an example of presenting messages within a view of a message frontend based upon categories of the messages.

FIG. 6 illustrates an example 600 of presenting messages within a view of a message frontend 602 based upon categories of the messages. A user may utilize the message frontend 602 for message communication. For example, the message frontend 502 may generally display messages for the user within an inbox. Unfortunately, the inbox may be inundated with a large number of emails that may or may not interest the user. Accordingly, messages may be categorized and presented in corresponding views (e.g., a view setting of an inbox, a separate viewing panel, etc.). In one example, the message frontend 602 may comprise a display newsletters button 604, a display social network button 606, a display alerts button 608, and/or other display buttons. The display newsletters button 604 may be used to display or hide (e.g., filter) newsletter messages within an inbox of the message frontend 602 (e.g., a garden club newsletter and a car dealer newsletter are displayed within the inbox). The display social network button 606 may be used to display or hide social network messages within the inbox (e.g., a stay connected message may be hidden within the inbox). The display alerts button 608 may be used to display of hide alert messages within the inbox (e.g., a job finder message may be hidden within the inbox). In this way, the message frontend 602 may display categorized messages based upon user desired display settings.

Figure 7:
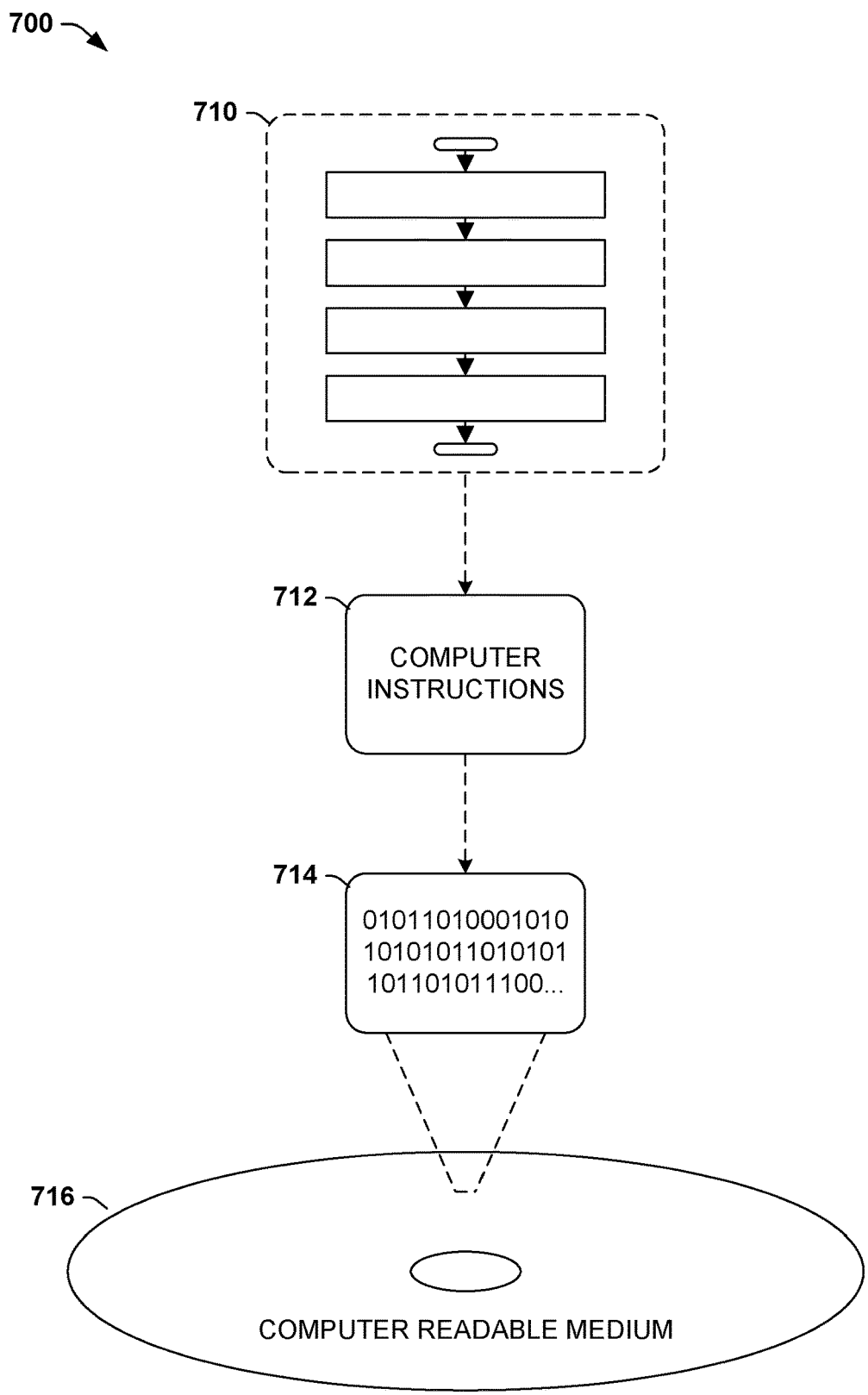
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as at least some of the exemplary method 100 of FIG. 1 and/or exemplary method 200 of FIG. 2, for example. In another such embodiment, the processor-executable instructions 712 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

It may be appreciated that at least one of A and B and/or the like generally means A or B or both A and B.

Figure 8:
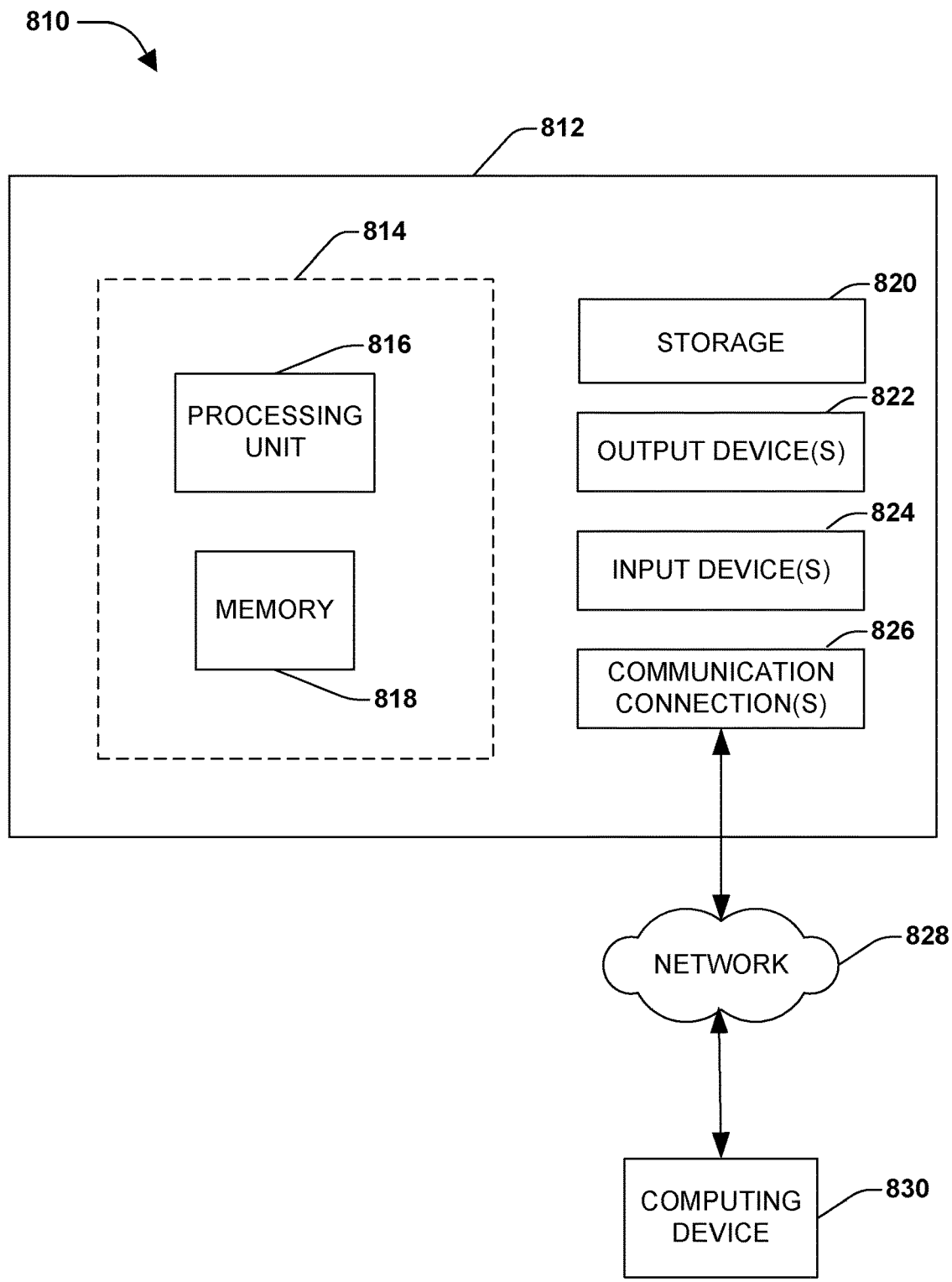
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), nonvolatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1384), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
defining a message behavior profile for a sender, the message behavior profile comprising:
a message read rate corresponding to a number of messages sent from the sender and read by recipients relative to a number of the messages sent from the sender and received by the recipients.

2. The method of claim 1, comprising associating the sender with an IP address and categorizing a message from the IP address based upon the message behavior profile.

3. The method of claim 1, comprising associating the sender with a domain and categorizing a message from the domain based upon the message behavior profile.

4. The method of claim 1, comprising associating the sender with an email address and categorizing a message from the email address based upon the message behavior profile.

5. The method of claim 1, comprising associating the sender with a user account and categorizing a message from the user account based upon the message behavior profile.

6. The method of claim 1, comprising associating the sender with a digital certificate and categorizing a message associated with the digital certificate based upon the message behavior profile.

7. The method of claim 1, comprising associating the sender with a phone number and categorizing a message from the phone number based upon the message behavior profile.

8. A system, comprising:
one or more processing units; and
memory comprising instructions that when executed by at least one of the one or more processing units perform a method comprising:

defining a message behavior profile for a sender, the message behavior profile comprising:

a message read rate corresponding to a number of messages sent from the sender and read by recipients relative to a number of the messages sent from the sender and received by the recipients.

9. The system of claim 8, the method comprising associating the sender with an IP address and categorizing a message from the IP address based upon the message behavior profile.

10. The system of claim 8, the method comprising associating the sender with a domain and categorizing a message from the domain based upon the message behavior profile.

11. The system of claim 8, the method comprising associating the sender with an email address and categorizing a message from the email address based upon the message behavior profile.

12. The system of claim 8, the method comprising associating the sender with a user account and categorizing a message from the user account based upon the message behavior profile.

13. The system of claim 8, the method comprising associating the sender with a digital certificate and categorizing a message associated with the digital certificate based upon the message behavior profile.

14. The system of claim 8, the method comprising associating the sender with a phone number and categorizing a message from the phone number based upon the message behavior profile.

15. A computer readable device comprising instructions that when executed perform a method, comprising:

defining a message behavior profile for a sender, the message behavior profile comprising:

a message read rate corresponding to a number of messages sent from the sender and read by recipients relative to a number of the messages sent from the sender and received by the recipients.

16. The computer readable device of claim 15, the method comprising associating the sender with an IP address and categorizing a message from the IP address based upon the message behavior profile.

17. The computer readable device of claim 15, the method comprising associating the sender with a domain and categorizing a message from the domain based upon the message behavior profile.

18. The computer readable device of claim 15, the method comprising associating the sender with an email address and categorizing a message from the email address based upon the message behavior profile.

19. The computer readable device of claim 15, the method comprising associating the sender with a user account and categorizing a message from the user account based upon the message behavior profile.

20. The computer readable device of claim 15, the method comprising associating the sender with a digital certificate and categorizing a message associated with the digital certificate based upon the message behavior profile.

\* \* \* \* \*